Nov. 16, 1971 G. P. STERNBERG 3,620,173
FERMENTABLE FLOUR WATER MIXTURE TREATMENT
Filed Nov. 15, 1967 3 Sheets-Sheet 1
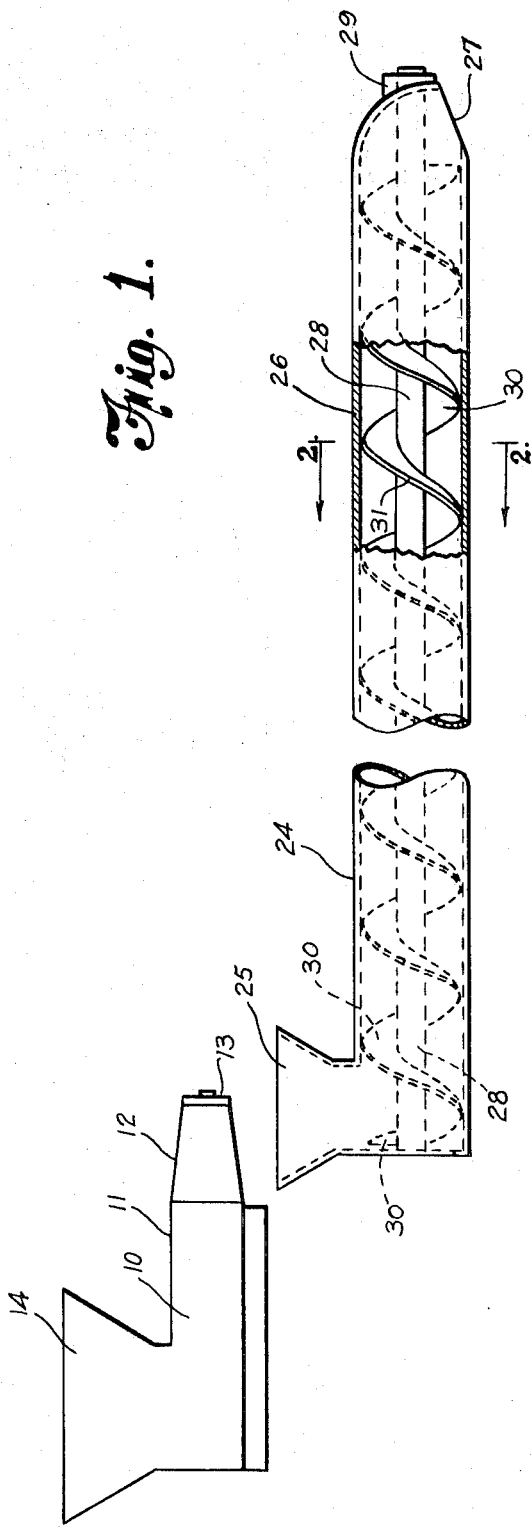
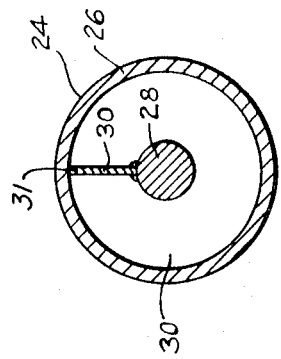
INVENTOR.
GEORGE P. STERNBERG
BY Alfred R. Fuchs
ATTORNEY INVENTOR.
GEORGE P. STERNBERG
BY
Alfred R. Fuchs
ATTORNEY Nov. 16, 1971  G. P. STERNBERG  3,620,173
FERMENTABLE FLOUR WATER MIXTURE TREATMENT
Filed Nov. 15, 1967  3 Sheets-Sheet 3
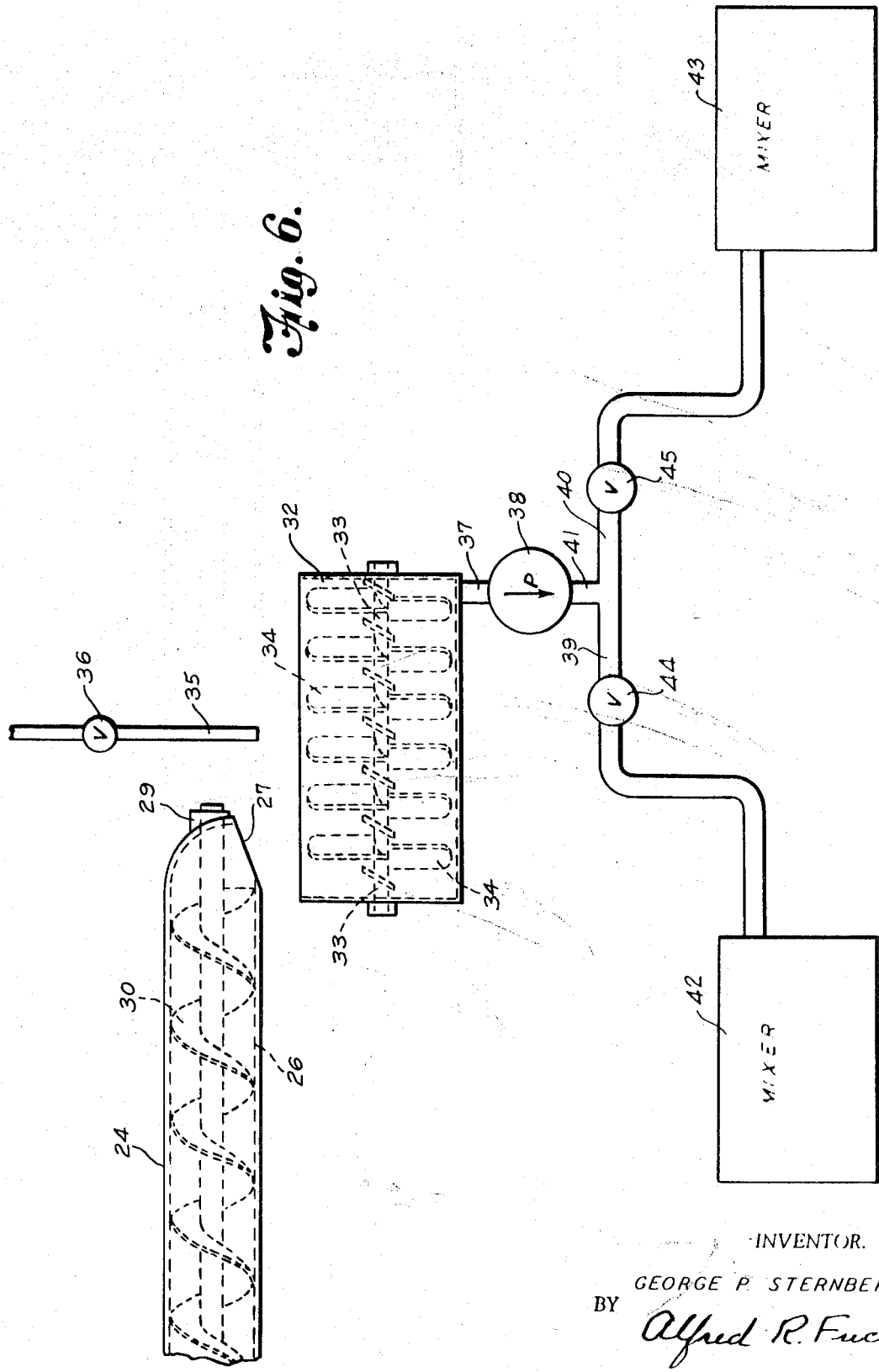
INVENTOR.
GEORGE P. STERNBERG
BY *Alfred R. Fuchs*
ATTORNEY

United States Patent Office 3,620,173
Patented Nov. 16, 1971

3,620,173
FERMENTABLE FLOUR WATER MIXTURE TREATMENT
George P. Sternberg, 727 W. 46th St.,
Kansas City, Mo. 64112
Filed Nov. 15, 1967, Ser. No. 683,253
Int. Cl. A21d 8/00
U.S. Cl. 107—54 B 9 Claims

ABSTRACT OF THE DISCLOSURE

The method of treating a fermentable flour water mixture such as a sponge, a straight dough, or a brew containing flour, used in the manufacture of bakery products, by fermenting the mixture at a higher than atmospheric pressure. In the case of a sponge or straight dough, the ingredients are mixed to blend them while subjected to a continuously increasing pressure, by passing the mixture through a tubular chamber from an inlet at one end to an adjustable size outlet at the other end, the chamber decreasing in cross section toward the outlet end. Positive feed is by a feed screw which mixes by interaction with longitudinal ribs on the inner face of the chamber. After the mixture has been blended it is fermented under higher than atmospheric pressure for from thirty minutes to two hours by feeding the mixture into one end of an elongated closed vessel, that confines the mixture under pressure while a feed screw advances it toward a discharge outlet, at the other end, the pressure being produced by expansion of the mixture during fermentation. The mixture, if a sponge, may produce two different bakery products that require different ingredient contents, by accumulating it in an open vessel, adding sufficient water thereto to produce a pumpable slurry and selectively pumping the slurry to either of a pair of dough mixers, where the additional amount of flour and other ingredients required to produce the kind of dough desired are added.

---

Figure 3:
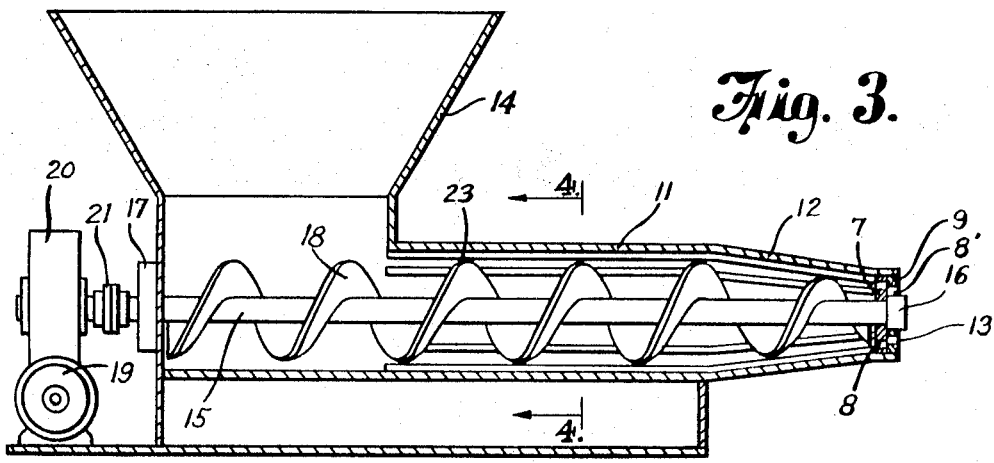

In the manufacture of doughs, such as bread dough, roll dough and other yeast leavened dough, there are three methods used, the sponge dough method and the straight dough method, which are batch methods, and a continuous mixing and developing method, in which a brew is used to provide a fermentable ingredient. The most common method used in commercial bakeries at the present time is the sponge dough method. In this method, the sponge is allowed to ferment generally for periods of from three and one-half to four and one-half hours. In the straight dough method, all the ingredients of the dough are mixed together and the dough is allowed to ferment a desired period of time. In the continuous mixing and developing method, the brew is fermented for a predetermined period of time and is added to the other dough ingredients only shortly before passing from a premixing container through the mixing and developing chamber, the brew being in the dough mixture only for a few minutes instead of for several hours, as in the sponge dough process and the straight dough process.

I have discovered that by subjecting the flour brew, or the sponge, or the straight dough to fermentation under higher than atmospheric pressure during the fermentation period, more complete or effective transformation of the starch content is obtained, with the result that the product made from a dough made by my method is superior in quality to and much more uniform in quality than the same bakery product made by previously known methods that involve fermentation of the dough, sponge or brew at atmospheric pressure. Also by fermentation under pressure the fermentation time can be reduced, from that required to obtain the same stage of fermentation when the fermentation is at atmospheric pressure. The total processing time is therefore considerably reduced. Also, because of better pre-conditioning of the flour, the time required for fully developing the dough, in either the final mixing operation where a sponge dough process is used, or in a continuous mixing process, can also be reduced.

The most common process in use in baking bread and similar yeast leavened bakery products today is the sponge dough process. In order to get the best possible product from a given flour, the two most important steps in the process that require the judgment or skill of the baker are the fermentation step and the final mixing step. The rate of fermentation is dependent upon the yeast, yeast food, temperature, sponge consistency, and the length of time that fermentation is carried on. In the final mixing stage, the most important control point is what is known as the clean-up point. This is the stage of mixing when the gluten structure begins. At this stage the dough becomes a cohesive mass which stretches and folds in the mixer instead of a wet mass or heavy slurry which will not hold together.

If the same clean-up point is maintained in mixing a series of doughs having the same ingredients and the total mixing time is held constant, the consistency of the doughs will be uniform and total development will be uniform. The development time of the doughs will be constant, the doughs will process uniformly and the final baked product will be uniform in character.

I have deiscovered by utilizing my method, correct fermentation of the sponge is more readily obtainable than when older methods of fermenting the sponge are used. Also, the fermentation development of the sponge is enhanced. This causes the characteristics of the finished product to be of a superior quality.

A considerable practical advantage of fermentation of the sponge, or straight dough remix, or flour brew, by my method is that not only does the dough require less development during the final mixing stage, but it also possesses a much greater tolerance to time or temperature variations which may occur during the mixing stage, thus affording even greater uniformity in the dough clean-up control procedure aforedescribed and consequently better quality control in the finished product.

The dough as finally developed, that has been fermented either in the sponge stage or otherwise, is very mellow and dry and has a silky, velvety feel which makes it possible to machine the dough in a standard bread molding machine very smoothly and uniformly.

Other objects and advantages of my invention will appear as the description of the drawings proceeds. However, I desire to have it understood that I do not intend to limit myself to the particular details shown or described except as defined in the claims.

Figure 4:
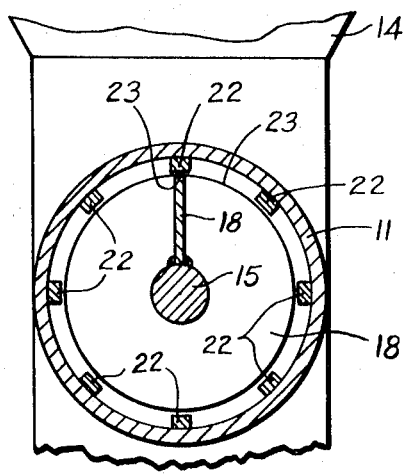
Figure 5:
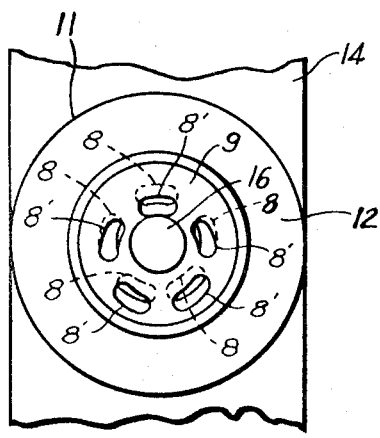

In the drawings:
FIG. 1 is a diagrammatic elevational view partly in longitudinal section through the apparatus used in carrying out my process through the mixing of the flour water mixture and the fermentation period, the fermentation vessel being partly broken away.
FIG. 2 is a section taken on the line 2—2 of FIG. 1.
FIG. 3 is a vertical, longitudinal sectional view through the mixer for the fermentable mixture.
FIG. 4 is a section, on an enlaged scale, taken on the line 4—4 of FIG. 3.
FIG. 5 is an end elevation thereof, and
FIG. 6 is a diagrammatic view showing apparatus to be used in carrying out the selective production of dough for two different kinds of bakery products.

In carrying out my method, the sponge mixture, or the straight dough mixture, is blended in an apparatus that mixes the ingredients and gradually applies an increasing pressure thereto. The pressure is preferably applied mechanically. The blended flour water mixture is then fed into one end of an elongated, closed vessel that confines the mixture under pressure and is conveyed by suitable means from the inlet at one end thereof to the outlet thereof at the other end, this chamber and its conveying means being of such a character that the sponge or straight dough is contained therein under pressure throughout the fermentation period, which may extend from a minimum of about thirty minutes to a maximum of two hours.

As an example of the ingredients of the sponge, that are blended and fermented under pressure in the above referred to manner, what is known as a seventy percent sponge may be treated comprising seventy pounds of flour, thirty-six pounds of water, two and one-half pounds of yeast, and one-half pound of yeast food. If what is known as one hundred percent sponge is to be provided, then one hundred pounds of flour, fifty-two pounds of water, two and one-half pounds of yeast, and one-half pound of yeast food may be used as ingredients thereof. If such a sponge is produced continuously and fed continuously into the fermentation chamber, the ingredients would be fed into a hopper provided on the blending apparatus at the proper number of pounds per minute in the proportions above stated to give the desired pounds of dough produced per minute or per hour.

As an example of a straight dough to be blended and fermented, the proportion of the ingredients could be sixty-two pounds of water to one hundred pounds of flour, two and one-half pounds of yeast, two pounds of salt, eight pounds of sugar, three pounds of lard, three pounds of dry milk and one-half pound of dough improver, if desired.

The sponge produced in the above referred to manner can be either mixed with the other ingredients required for making the dough after having passed through the fermentation period, in an ordinary batch mixer or in a continuous dough mixer. If a seventy percent sponge was fermented, then the ingredients added in the dough mixer would usually include thirty pounds of flour, approximately twenty-six pounds of water, two pounds of salt, eight pounds of sugar, three pounds of lard, three pounds of milk and one-half pound of dough improved, if desired. If one hundred percent sponge is fermented, then usually ten pounds of water, two pounds of salt eight pounds of sugar, three pounds of lard, three pounds of milk and one-half pound of dough improver, if desired, is added, but no more flour.

If a continuous mixer is used for proceeding with the process of making a dough from the fermenting sponge, then these ingredients are added at the point where the material that has been fermenting in the elongated chamber has passed therefrom to the continuous dough mixer in the above stated proportions at a rate of the proper number of pounds per minute to give the desired number of pounds of dough produced per minute, or hour.

If a straight dough method is used, then the dough is passed from the chamber in which the fermentation thereof took place to suitable apparatus for dividing the dough into loaf portions and molding into loaves, or if a partially developed straight dough method is used the dough is passed from the chamber in which fermentation took place into a final developer; imparting desired degree of final development to the dough, then divided into loaf portions and molded into loaves.

For making a dough having approximately sixty-five pounds of water to one hundred pounds of flour for use in the continuous mixing process, the brew that would be used therein would contain from thirty-five to fifty pounds of flour to sixty-five pounds of water. The amount of flour to water has to be such that the brew will not be too thick so that it can be readily pumped. In order to ferment the brew under pressure, the brew is preferably placed in a closed container and air or other inert gas is supplied to the container under pressure to put the brew under pressure for the proper fermenting period.

In FIG. 1 an apparatus is shown diagrammatically for mixing the sponge or the straight dough mixture and fermenting it. The mixer 10 is shown more in detail in FIG. 3 having a tubular body portion 11 provided with a tapering end portion 12 and an adjustable outlet 13. The tubular body portion 11 is provided with a hopper 14 for receiving the ingredients to be mixed. Any suitable means may be provided for feeding the material into the hopper 14 in batches or continuously in the proper proportions of flour, water, yeast, yeast food, and other ingredients required for producing a sponge or a straight dough mixture as may be desired. A shaft 15 extending longitudinally of the mixer is mounted in suitable bearings 16 and 17. The shaft has provided thereon a conveyer screw 18, of a diameter to correspond substantially to the diameter of the tubular casing portion 11 and tapering end portion 12 thereof. Said shaft 15 is driven by a motor 19 through a reduction gearing 20 and coupling 21. The interior surface of the tubular portion 11, including tapering end portion 12, is provided with a plurality of ribs 22 arranged at regularly spaced intervals around the same and extending lengthwise thereof substantially parallel to the axis of the tubular portion of the mixer body. The peripheral edge 23 of the conveyer screw 18 is closely adjacent the inner curved wall portion of the tubular body portion 11 and operates in very close adjacency to the ribs 22. The adjustable outlet 13 comprises a fixed end wall 7 on which bearing 16 is mounted having elongated openings 8 therein and a circular plate 9 rotatably mounted in end portion 12 having elongated openings 8' therein eccentric to the axis of rotation thereof.

In the operation of the mixer, the ingredients that are introduced through the hopper 14 are first conveyed by screw 18 into the tubular portion 11 and thoroughly blended by the action of the conveyer screw and the ribs 22 on the inner face of the tubular portion 11 and tapering portion 12. The fact that the tapering portion 12 decreases in diameter toward the outlet 13 and the outlet 13 is of smaller size than the internal diameter of the tubular portion 11, causes a pressure to be exerted on the mixture being fed toward the outlet 13, which gradually increases toward said outlet end of the tubular body portion of the mixer. This mixing under increasing pressure, acts on the starch and gluten in the flour so as to cause the same to be more thoroughly transformed during the fermentation period, which takes place immediately after the discharge of the mixture from the mixing device. By providing the ribs 22 a pulling action is exerted on the flour water mixture, whether a sponge mixture or a straight dough mixture, which aids in the development of the same.

While other fermentation apparatus and other suitable methods for fermenting the resulting mixture discharged from the mixing vessel 10 may be provided, preferably the thoroughly mixed and blended ingredients of the sponge or straight dough mixture are fed to a fermenting vessel 24 shown diagrammatically in FIG. 1. The fermenting vessel can also be used to act on a sponge or straight dough mixture produced in other ways than by the mixing vessel 10 described hereinbefore.

Referring now to FIG. 1, a hopper 25 is shown that receives the blended mixture from the discharge outlet 13 of the mixing vessel 10 and feeds it into the fermenting vessel 24. The fermenting vessel 24 is provided with a tubular body portion 26 which is preferably smooth surfaced and which is closed except for the opening into the hopper 25 and the discharge opening 27. The tubular body portion 26 is of a suitable length to maintain the body of fermentable mixture in the same for the required length of time to obtain the desired fermentation period for the fermentable mixture contained therein. Extending longitudinally of the tubular body portion 26 is the shaft 28 which is mounted in suitable bearings 29 and at opposite ends of said fermentation vessel. The shaft 28 has provided thereon a conveyer screw 30 that operates in the tubular body portion 26 with the peripheral edge 31 thereof in close adjacency to the inner smooth face of the tubular wall 26. Any suitable means (not shown) may be provided for driving the shaft 28, and said driving means is provided with suitable means for maintaining such a rate of rotation of the shaft 28 that the fermentable flour water mixture contained in the fermenting vessel 24 will travel from the hopper 25 to the outlet 27 in the time period required for proper fermentation of the mixture, whether it be a sponge or a straight dough mixture. The fermentable flour water mixture that has been introduced through the hopper 25 is expanding the entire time that it is travelling along the tubular housing 26 to the discharge opening 27 thereof and, being confined, will be put under pressure due to the expansion in volume thereof by the fermentation of the mixture, thus being fermented under pressure the entire time that the same is in the tubular body portion 26 of said vessel 24.

While certain preferred examples of a sponge mixture and of a straight dough mixture are referred to hereinbefore, the proportions may be varied as may be found desirable by the user of my method. For example, a flour water mixture containing all the flour to be contained in the final dough mixture, but not all the water and other ingredients required in the fully developed dough, could be used in carrying out my method. In order that the mixture will be properly acted on in the mixing vessel and properly carried forwardly in the fermenting vessel it is necessary that the mixture have a certain amount of body thereo, which would not be existent in a brew containing flour and for this reason the apparatus provided for fermenting such a brew under pressure would have to consist of a suitable closed vessel, which can be provided means for supplying air, or gas of an inert character, thereto to maintain the brew under pressure so as to obtain the desired action of above atmospheric pressure on the starch in the brew in a similar manner to that provided by the above referred to apparatus in the case of a sponge, a straight dough mixture, or other flour water mixture containing all the flour to be included in the dough.

Ordinarily the fermented flour water mixture produced by my method would be used to produce one particular kind of dough such as bread dough or a bun dough or a sweet dough. Said fermented flour water mixture can be finally developed either by a continuous or a batch process as may be desired. If a continuous process is to be used the desired proportion of ingredients is fed continuously in metered amounts to the mixing vessel 10, continuously fed therefrom into the fermenting vessel 24 and continuously fed into a pre-mixer at a metered rate where the ingredients required to form a dough mixture are continuously added at a metered rate, the resulting mixture being fed continuously from the pre-mixer to a continuous dough developer to complete the development of the dough. If a batch process is to be used the fermentable flour water mixture can be either fed to the mixing vessel 10 in batches and these batches processed in the usual manner after discharge from the fermenting vessel 24 or fed continuously as above stated at a metered rate into the mixing vessel 10, discharged into the fermenting vessel 24 therefrom and upon discharge from said fermenting vessel divided into batches of suitable size and these batches processed in the usual manner.

In FIG. 6 an apparatus is shown diagrammatically, for utilizing the sponge, or a flour water mixture containing all the flour to be contained in the dough produced by my improved method, for selectively producing two different types of products in an efficient manner. The discharge end of the vessel 24 is shown as being located above an open-topped vessel 32 which may be provided with a suitable shaft 33 driven in any suitable manner and which is provided with paddles 34 thereon for advancing the contents of the vessel 32 toward the right as shown in FIG. 6. Means is provided for supplying additional liquid, such as water, to the open-topped vessel 32 such as a supply pipe 35 provided with a suitable valve 36 for controlling the supply of water, for example, to the open-topped mixing vessel 32. The amount of water that is supplied through the pipe 35 to the vessel 32 is such as to make a slurry of the relatively stiff flour water mixture that has been fermented in the vessel 24 and discharged therefrom into the vessel 32. The slurry must be sufficiently fluid that it can be pumped selectively from the vessel 32, in a manner to be described below, to suitable mixing means.

The apparatus shown diagrammatically in FIG. 6 further comprises a discharge pipe 37 leading from the vessel 32 to a pump 38 and suitable pipes or conduits 39 and 40 extending from a common discharge pipe 41 from the pump 38 to suitable mixing apparatus 42 and 43 through controlling valves 44 and 45.

The mixers 42 and 43 may be of any desired type and size. However, in carrying out my method, the mixer 42 is used for producing a bread dough mixture while the mixer 43 may be used for producing a bun dough mixture. The sponge mixture discharged into the open-topped vessel 32 would ordinarily be of such a character that it would contain about twice as much flour as water by weight. This mixture will continue to ferment as it passes from the vessel 24 to the vessel 32. Preferably the sponge contains flour, water, yeast and yeast food in the following proportions: ninety pounds of flour to forty-six pounds water, two and one-half pounds of yeast and one-half pound of yeast food.

The vessel 32 may be regarded as an intermediate pre-mixer, as it serves to mix the fermenting sponge with water to produce the desired slurry. To such a sponge mixture as above referred to, fourteen pounds of water would be added in the intermediate pre-mixing vessel 32 for each ninety pounds of flour fed thereto, in the mixture passing from the outlet 27 and, if desired, also two pounds of salt may be added to each ninety pounds of flour. The slurry that is thus produced is then pumped to either the mixer 42 or 43 as the case may be.

Presuming that the mixer 42 is to be used for producing a bread dough, to each ninety pounds of flour passing from the outlet 27, ten pounds of flour, eight pounds of sugar, three pounds of lard, three pounds of dry milk, and one-half pound of dough improver may be added to the slurry to produce the bread dough, these added ingredients being thoroughly mixed to the desired extent in the mixer 42 to produce the desired bread dough. Assuming that the mixer 43 is to be used for producing a bun dough, ten pounds of flour are also added to each ninety pounds of flour in the sponge, but instead of the above referred to ingredients, ten pounds of sugar, one pound of dry milk, four pounds of lard, and if desired, one-half of dough improver are added to the slurry to produce the desired dough for making buns and similar products.

It will thus be seen that the apparatus shown diagrammatically in FIG. 6 is adapted for selectively producing a dough for two different bakery products from a fermenting flour water mixture that is a basic ingredient of both, by mixing sufficient water with the mixture in the vessel 32 to produce a pumpable flour water slurry, which can be selectively pumped to either of a pair of dough mixers and adding the amount of flour and other ingredients required, in the mixer selected, to produce the dough for the products to be produced from the dough that is mixed in that particular mixer. The fermenting flour water mixture can be accumulated and held in the vessel 32 until required for use in either mixer 42 or 43 as the case may be. The pump can then be operated to withdraw the accumulated fermenting mixture, in the form of a slurry from the vessel 32 and move it to the selected mixer. The slurry preferably is of such a character that the proportion of flour to water is approximately three to two, this producing a pumpable mixture that can be moved to the desired mixer through the pump provided in the apparatus diagrammatically disclosed in FIG. 6 and can then be mixed without difficulty with the added ingredients to produce the type of dough desired.

My method of selectively producing a dough for two different bakery products can be adapted to a continuous dough developing method by providing means for continuously feeding the slurry at metered rates to either or both of two different continuous dough developers and adding the ingredients required for the particular dough to be developed in each of said developers to the slurry at a metered rate before the mixture enters the continuous dough developer.

What I claim is:

1. The method of treating a fermentable flour water mixture comprising first blending said mixture while continuously subjecting said mixture to pressure higher than atmospheric and then fermenting the blended mixture under pressure higher than atmospheric.

2. The method claimed in claim 1 in which the pressure to which said mixture is subjected is progressively increased during said blending step.

3. The method claimed in claim 1 in which said blended mixture is subjected to pressure higher than atmospheric for from thirty minutes to two hours while fermenting said mixture for said period of time.

4. The method claimed in claim 1 in which a pulling action is exerted on said mixture during said blending step.

5. In a method of selectively producing dough for two different bakery products from a fermenting flour water mixture too stiff to pump, producing said flour water mixture by first blending said flour water mixture at above atmospheric pressure and then fermenting said blended flour water mixture at above atmospheric pressure, accumulating said fermenting mixture in an open vessel, mixing sufficient water with said mixture in said vessel to produce a pumpable flour water slurry therefrom, selectively pumping said slurry to either of a pair of dough mixers, adding the amount of flour and other ingredients required to produce the dough for one of said products to said slurry pumped to the one of said dough mixers, mixing the contents of said mixer to develop said dough, adding the amount of flour and other ingredients required to produce the dough for the other of said products to said slurry pumped to the other of said mixers and mixing the contents of said last mentioned mixer to develop said last mentioned dough.

6. The method claimed in claim 5 in which the quantity of water added produces a pumpable slurry in which the ratio of flour to water is approximately three to two.

7. The method claimed in claim 5 in which the fermenting flour water mixture to be accumulated in said open vessel contains approximately twice as much flour as water by weight.

8. The method of making a fermented flour water mixture comprising supplying a fermentable flour water mixture to a mixing chamber, blending said mixture by continuously agitating said mixture while subjecting said mixture to pressure higher than atmospheric and while moving the same through said chamber, discharging said blended mixture continuously from said chamber into a fermenting zone and continuously conveying the blended fermentable mixture discharged from said chamber through said fermenting zone at a predetermined rate to ferment said blended mixture for a predetermined period of time without completely developing said mixture.

9. The method of treating a fermentable flour water mixture comprising blending the same by continuously subjecting said mixture to pressure higher than atmospheric while mixing the same without completely developing said mixture and subjecting said mixture to pressure higher than atmospheric while advancing said blended mixture through a fermenting zone with minimum agitation thereof while fermenting said blended mixture.

References Cited

UNITED STATES PATENTS

| | | | |
|---|---|---|---|
| 1,923,880 | 8/1933 | Petersen | 99—90 |
| 2,505,125 | 4/1950 | List | 107—14.4 UX |
| 3,125,968 | 3/1964 | Baker | 107—54.2 X |
| 3,198,142 | 8/1965 | Lothes | 99—90 CB X |
| 3,383,096 | 5/1968 | Braibanti | 107—30 X |
| 3,429,712 | 2/1969 | Turner | 99—90 |
| 2,953,460 | 9/1960 | Baker | 107—4.2 X |

FOREIGN PATENTS

| | | | |
|---|---|---|---|
| 779,374 | 7/1957 | Great Britain | 107—54.2 |
| 788,827 | 1/1958 | Great Britain | 99—90 CB |
| 934,255 | 8/1963 | Great Britain | 99—90 CB |
| 423,863 | 7/1947 | Italy | 107—14.4 |

WALTER A. SCHEEL, Primary Examiner

A. O. HENDERSON, Assistant Examiner

U.S. Cl. X.R.

107—40

UNITED STATES PATENT OFFICE
CERTIFICATE OF CORRECTION

Patent No. 3,620,073  Dated November 16, 1971

Inventor(s) Burnell N. Robbins

It is certified that error appears in the above-identified patent and that said Letters Patent are hereby corrected as shown below:

Column 6, line 66, after "shaft;" delete --a--.

Signed and sealed this 25th day of April 1972.

(SEAL)
Attest:

EDWARD M. FLETCHER, JR.　　　　　ROBERT GOTTSCHALK
Attesting Officer　　　　　　　　　Commissioner of Patents